(12) United States Patent
Wegerich et al.

(10) Patent No.: US 6,859,739 B2
(45) Date of Patent: Feb. 22, 2005

(54) GLOBAL STATE CHANGE INDICATOR FOR EMPIRICAL MODELING IN CONDITION BASED MONITORING

(75) Inventors: Stephan W. Wegerich, Glendale Heights, IL (US); David R. Bell, Clarendon Hills, IL (US); Xiao Xu, Wheaton, IL (US)

(73) Assignee: Smartsignal Corporation, Lisle, IL (US)

( * ) Notice: Subject to any disclaimer, the term of this patent is extended or adjusted under 35 U.S.C. 154(b) by 527 days.

(21) Appl. No.: 09/794,454

(22) Filed: Feb. 27, 2001

(65) Prior Publication Data

US 2002/0128731 A1 Sep. 12, 2002

Related U.S. Application Data

(60) Provisional application No. 60/262,747, filed on Jan. 19, 2001.

(51) Int. Cl.$^7$ .............................................. G05B 21/00
(52) U.S. Cl. ........................................ 702/32; 700/266
(58) Field of Search ............................. 702/22, 30, 32; 700/266

(56) References Cited

U.S. PATENT DOCUMENTS

| | | | |
|---|---|---|---|
| 3,045,221 A | | 7/1962 | Roop |
| RE31,750 E | | 11/1984 | Morrow |
| 4,517,468 A | * | 5/1985 | Kemper et al. ............... 290/52 |
| 5,109,700 A | * | 5/1992 | Hicho ........................ 73/660 |
| 5,586,066 A | | 12/1996 | White et al. |
| 5,610,339 A | * | 3/1997 | Haseley et al. ............... 73/660 |
| 5,689,434 A | * | 11/1997 | Tambini et al. ............. 700/282 |
| 5,710,723 A | * | 1/1998 | Hoth et al. .................. 702/181 |
| 5,774,379 A | | 6/1998 | Gross et al. |
| 5,808,903 A | * | 9/1998 | Schiltz et al. ................. 702/56 |
| 5,842,157 A | * | 11/1998 | Wehhofer et al. ........... 702/189 |
| 5,917,428 A | * | 6/1999 | Discenzo et al. ...... 340/870.01 |
| 5,943,634 A | * | 8/1999 | Piety et al. ................... 702/56 |
| 5,987,399 A | | 11/1999 | Wegerich et al. |
| 6,041,287 A | * | 3/2000 | Dister et al. ................. 702/182 |
| 6,567,752 B2 | * | 5/2003 | Cusumano et al. ........... 702/34 |
| 6,591,166 B1 | * | 7/2003 | Millett et al. ............... 700/266 |
| 6,591,296 B1 | * | 7/2003 | Ghanime .................... 709/224 |
| 6,609,212 B1 | * | 8/2003 | Smith ............................ 714/4 |
| 6,678,639 B2 | * | 1/2004 | Little et al. ................. 702/188 |

FOREIGN PATENT DOCUMENTS

WO     WO 00/67412     11/2000

OTHER PUBLICATIONS

"Application Of A New Technique For Modeling System Behavior" by Paul J. O'Sullivan, presented at the ISA Symposium, Edmonton, Alberta, May 1, 1991, © Copyright 1991 Instrument Society of America (21 pp.).

"A Universal, Fault–Tolerant, Non–Linear Analytic Network For Modeling And Fault Detection," by J. E. Mott, R. W. King, L. R. Monson, D. L. Olson, and J. D. Staffon, Proceedings of the 8th Power Plant Dynamics, Control & Testing Symposium, Knoxville, Tennessee, May 27–29, 1992 (14 pp.).

(List continued on next page.)

Primary Examiner—Patrick Assouad
Assistant Examiner—Craig Steven Miller
(74) Attorney, Agent, or Firm—Fitch, Even, Tabin & Flannery

(57) ABSTRACT

An improved empirical model-based surveillance or control system for monitoring or controlling a process or machine provides identification of transitions between operational states. Empirical model-based estimates generated in response to receiving actual operational parameters are compared using a global similarity operator to the actual parameters to indicate whether the process or machine is operating in a stable state, or is in transition from one state to another.

31 Claims, 7 Drawing Sheets

OTHER PUBLICATIONS

ModelWare™ Product Review by Robert D. Flori, reprinted from Computerized Investing, Sep./Oct. 1992, vol. XI, No. 5, copyright by The American Association of Individual Investors (pp. 8–10).

ModelWare™ A New Approach to Prediction by Ken Tucker, reprinted from PC AI magazine, Jan./Feb. 1993, pp. 14, 15, 30.

"Similarity Based Regression: Applied Advanced Pattern Recognition for Power Plant Analysis," by E. J. Hansen and M. B. Caudill, presented at the 1994 EPRI Heat Rate Improvement Conference (9 pp.).

"Applied Pattern Recognition For Plant Monitoring And Data Validation," by Ron Griebenow, E. J. Hansen, and A. L. Sudduth, presented at the Fifth International Joint ISA POWID/EPRI Controls and Instrumentation Conference, La Jolla, California, Jun. 19–21, 1995 (11 pp.).

"Model–Based Nuclear Power Plant Monitoring And Fault Detection: Theoretical Foundations," by Ralph M. Singer, Kenny C. Gross, James P. Herzog, Ronald W. King, and Stephan Wegerich, presented at the International Conference on Intelligent System Application to Power Systems (ISAP '97), Jul. 6–10, 1997, Seoul, Korea (pp. 60–65).

"Application Of A Model–Based Fault Detection System To Nuclear Plant Signals," by K. C. Gross, R. M. Singer, S. W. Wegerich, J. P. Herzog, R. VanAlstine, and F. Bockhorst, presented at the International Conference on Intelligent System Application to Power Systems (ISAP '97), Jul. 6–10, 1997, Seoul, Korea (pp. 66–70).

"MSET Modeling Of Crystal River–3 Venturi Flow Meters" by J. P. Herzog, S. W. Wegerich, K. C. Gross, and F. K. Bockhorst, 6th International Conference on Nuclear Engineering, ICONE–6169, May 10–14, 1998, Copyright © 1998 ASME (12 pp).

\* cited by examiner

GLOBAL STATE CHANGE INDICATOR FOR EMPIRICAL MODELING IN CONDITION BASED MONITORING

CROSS REFERENCE TO RELATED APPLICATION

This application claims benefit of U.S. Provisional Application No. 60/262,747, filed Jan. 19, 2001.

FIELD OF THE INVENTION

The present invention relates to monitoring machines and physical processes for early detection of impending equipment failure or process disturbance and on-line, continuous validation of sensor operation. More particularly, the invention relates to systems and methods for automatically determining the onset and completion of transitions between operational states of a system monitored using empirical models.

BACKGROUND OF THE INVENTION

A variety of new and advanced techniques have emerged in industrial process control, machine control, system surveillance, and condition based monitoring to address drawbacks of traditional sensor-threshold-based control and alarms. The traditional techniques did little more than provide responses to gross changes in individual metrics of a process or machine, often failing to provide adequate warning to prevent unexpected shutdowns, equipment damage, loss of product quality or catastrophic safety hazards.

According to one branch of the new techniques, empirical models of the monitored process or machine are used in failure detection and control. Such models effectively leverage an aggregate view of surveillance sensor data to achieve much earlier incipient failure detection and finer process control. By modeling the many sensors on a process or machine simultaneously and in view of one another, the surveillance system can provide more information about how each sensor (and its measured parameter) ought to be behaving. An example of such an empirical surveillance system is described in U.S. Pat. No. 5,764,509 to Gross et al., the teachings of which are incorporated herein by reference. Therein is described an empirical model using a similarity operator against a reference library of known states of the monitored process, and an estimation engine for generating estimates of current process states based on the similarity operation, coupled with a sensitive statistical hypothesis test to determine if the current process state is a normal or abnormal state. Other empirical model-based monitoring systems known in the art employ neural networks to model the process or machine being monitored.

Such empirical model-based monitoring systems require as part of installation and implementation some baseline data characterizing the normal operation of the process or machine under surveillance. The empirical model embodies this baseline normal operational data, and is only as good as the data represents normal operation. A big challenge to the success of the empirical model in the monitoring system, therefore, is to provide sufficiently representative data when building the empirical model. In practice, this is possibly the greatest hurdle for successful implementation of empirical model-based surveillance systems.

A first problem is whether to use data from merely a like process or the identical process with the one being monitored. This is especially significant when monitoring a commodity machine, that is, a machine that will be mass-produced with on-board condition monitoring. Under such circumstances, it may not be possible or practical to gather normal operational data from each machine to build unique empirical models beforehand. What is needed is a way of building a general model into the newly minted machines, and allowing the model to adapt to the unique tolerances and behavior of each particular machine in the field.

A second problem presents itself as the monitored process or machine settles with age, drifting from the original normal baseline, but still being in good operational condition. It is extremely difficult to capture such eventually normal operational data from a process or machine for which that would currently not constitute normal operation. What is then needed is a way for the empirical model to adapt to acceptable changes in the normal operation of the process or machine with age, without sacrificing the monitoring sensitivity that necessitated the empirical model approach in the first place.

A third problem exists where it is not possible to capture the full normal operational range of sensor data from the process due to the financial or productive value of not disrupting the process. For example, in retrofitting an existing industrial process with empirical model-based monitoring, it may not be economically feasible to effectively take the process off-line and run it through its many operational modes. And it may be months or years before all the operational modes are employed. Therefore, what is needed is a way to adapt the empirical model as the operational modes of the process or machine are encountered for the first time.

In summary, in order for an empirical model based process surveillance system to function reliably, the data used to generate the model should span the full process operating range. In many cases that data are not available initially. Therefore, model adaptation is needed to keep the model up-to-date and valid. But adaptation imposes significant hurdles of its own. One such hurdle is determining exactly when to start adapting the model, especially for dynamic non-linear processes. While in some cases human intervention can be relied upon to manually indicate when to adapt, in the vast majority of circumstances it is desirable to automate this determination. Another such hurdle is determining when to stop adapting the model and reinitiate process or machine surveillance. Yet another problem is to distinguish the need for adaptation from a process upset or a sensor failure that should be properly alarmed on. It is highly desirable to avoid "bootstrapping" on a slow drift fault in the process, for example. Yet another problem is to avoid adapting during a period of transition between one stable state and another, during which sensor data may not be typically representative of either any old state or a new state of normal operation of the process or machine. Yet another problem in adapting the empirical model is that the model may grow and become less accurate or less specific due to the addition of new states. Therefore, it would be beneficial to have a way of removing least commonly encountered states from the model while adding the newly adapted states.

SUMMARY OF THE INVENTION

The present invention provides an improved empirical model-based system for process or machine control and condition-based monitoring.

This invention is a method and apparatus for deciding when an empirical model of a process or machine should be adapted to encompass changing states in that process or machine, as measured by sensors, derived variables, statistical measures or the like. The technique is based on the information provided by a similarity measurement technology and statistical decisioning tools. This system has a second characteristic in that it determines when to stop the model adaptation process. This system has a third capability of distinguishing between process change and instrument change cases.

In a process or machine that is fully instrumented with sensors for all parameters of interest, sensor data is collected for all regimes possible of expected later operation of the same or similar processes or machines. This collected data forms a history from which the inventive system can "learn" the desired or normal operation of the process or machine, using training routines that distill it to a representative set of sensor data. Using this representative training set of sensor data, the present invention is able to monitor the process or machine in real-time operation (or in batch mode, if preferred), and generate estimates for all the sensors, including certain of the sensors for which historic data was collected, but which have failed or which were removed from the process or machine. The present invention can be employed as a means of adapting the representative set of sensor data to accommodate changes to the monitored system that are considered within the acceptable or normal range of operation.

The apparatus of the present invention can be deployed as an electrically powered device with memory and a processor, physically located on or near the monitored process or machine. Alternatively, it can be located remotely from the process or machine, as a module in a computer receiving sensor data from live sensors on the process or machine via a network or wireless transmission facility.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF THE PREFERRED EMBODIMENTS

Figure 1:
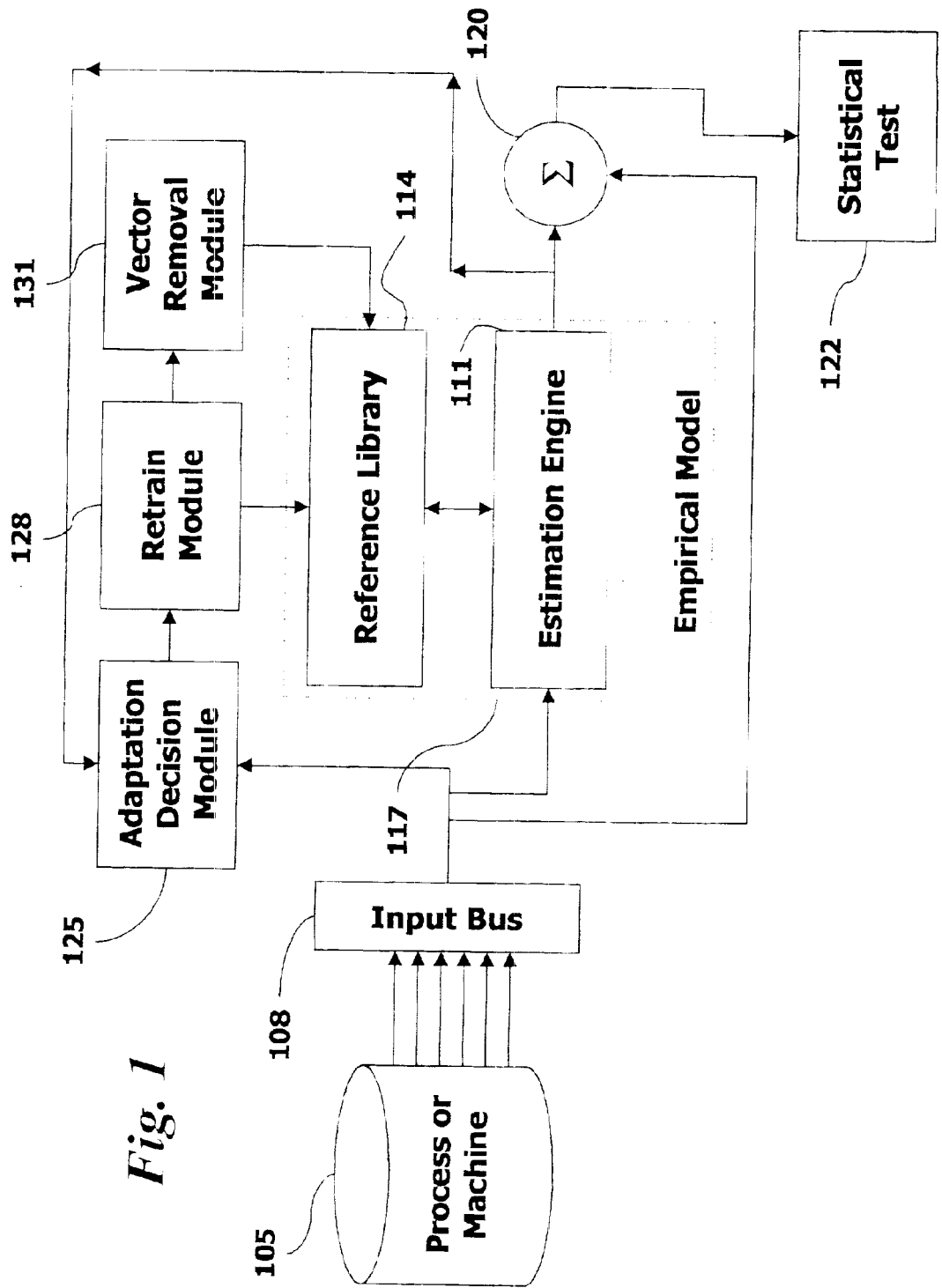
FIG. 1 illustrates a block diagram of the invention for adapting an empirical model-based monitoring system for an instrumented process or machine.

Turning to FIG. 1, a block diagram is shown of the inventive adaptive empirical model-based monitoring system. A process or machine 105 is instrumented with sensors for detecting various physical, statistical, qualitative or logical parameters of the process or machine operation. These are typically provided to the inventive system via an input bus 108, exemplified by a FieldBus type bus in a process control system in an industrial plant. The data representing the current state of the process or machine 105 is fed from input bus 108 to an estimation engine 111, which is coupled to a reference library 114 of past data representative of normal or acceptable states of operation of the process or machine. Together, the estimation engine 111 and the reference library 114 comprise the empirical model 117 that models the process or machine.

In standard monitoring mode, the sensor data from input bus 108 are also provided to a differencing engine 120 that is disposed to receive estimates of the current state generated by the empirical model 117 in response to input of the actual current state of the process or machine. The differencing engine subtracts for each sensor involved the estimate from the actual, and provides these individual outputs to a statistical testing module 122 that determines whether the estimate and actual values are the same or statistically different, in which case an alert is displayed or otherwise provided to further automated control systems. By way of example, the statistical testing module 122 can be disposed to perform a sequential probability ratio test (SPRT) on each of the differenced sensor signals coming from differencing engine 120, to provide alerts for each signal that is not "normal" or acceptable. In this manner, monitoring of the process or machine is carried out based on the empirical model, providing greater sensitivity and improved lead warning time for failures.

Current sensor data can also be provided to adaptation decision module 125. According to the present invention, this module makes a determination of whether the current snapshot of sensor data from the process or machine 105 represents a process upset or a sensor failure, or in contrast represents the start of a transition to a new operational state requiring adaptation of the model, or the stop of a transition to a new operational state. Upon recognizing the start of such a transition, the alert-type output of the empirical model-based monitoring can be temporarily suspended to avoid inundating a human operator or a downstream control system with unnecessary alert information. Upon recognizing the stop of the transition, the adaptation decision module 125 can enable a retraining module 128 disposed to carry out the actual changes to the reference library 114 necessary to effect adaptation of the model. After the stop of the transition, the process or machine 105 is expected to be in a stabilized new state that may not be represented in the reference library 114. After the transition is complete, the adaptation decision module 125 initiates via the retraining module 128 capture of new snapshots of live data to augment the reference library 114. In the event that the reference library grows too large, or is desirably maintained at a certain size (e.g., for performance considerations), the vector removal module 131 can weed out old snapshots from the reference library according to certain criteria. Upon completion of the adaptation of the reference library, on-line monitoring is commenced again.

The invention provides a fully automated model adaptation decision-making technique for condition based monitoring of a machine or process. The adaptation decision module can employ the same similarity operator techniques that can be employed in the empirical model for generating estimates, as discussed below. Accordingly, the current sensor snapshot from the input bus 108 is compared using the similarity operator to the estimate generated in response thereto by the estimation engine 111 to generate a similarity score called global similarity for purposes hereof. This global similarity is itself a signal that can be monitored and processed snapshot over snapshot. The behavior of the global similarity is one means by which the inventive module can distinguish the need for adaptation from a mere process or sensor upset.

Turning now first to the regular monitoring mode of the inventive surveillance system, an empirical model-based method and system for monitoring a process or machine is described in the aforementioned U.S. Pat. No. 5,764,509 to Gross et al. Implementing such a monitoring system comprises two stages, a first stage for building the empirical model (also known as "training"), and a second stage of turning live monitoring on. Other empirical models that train on known data could also be employed, such as neural networks, but for purposes of illustration, an empirical model along the lines of the Gross patent as a baseline will be described.

Figure 2:
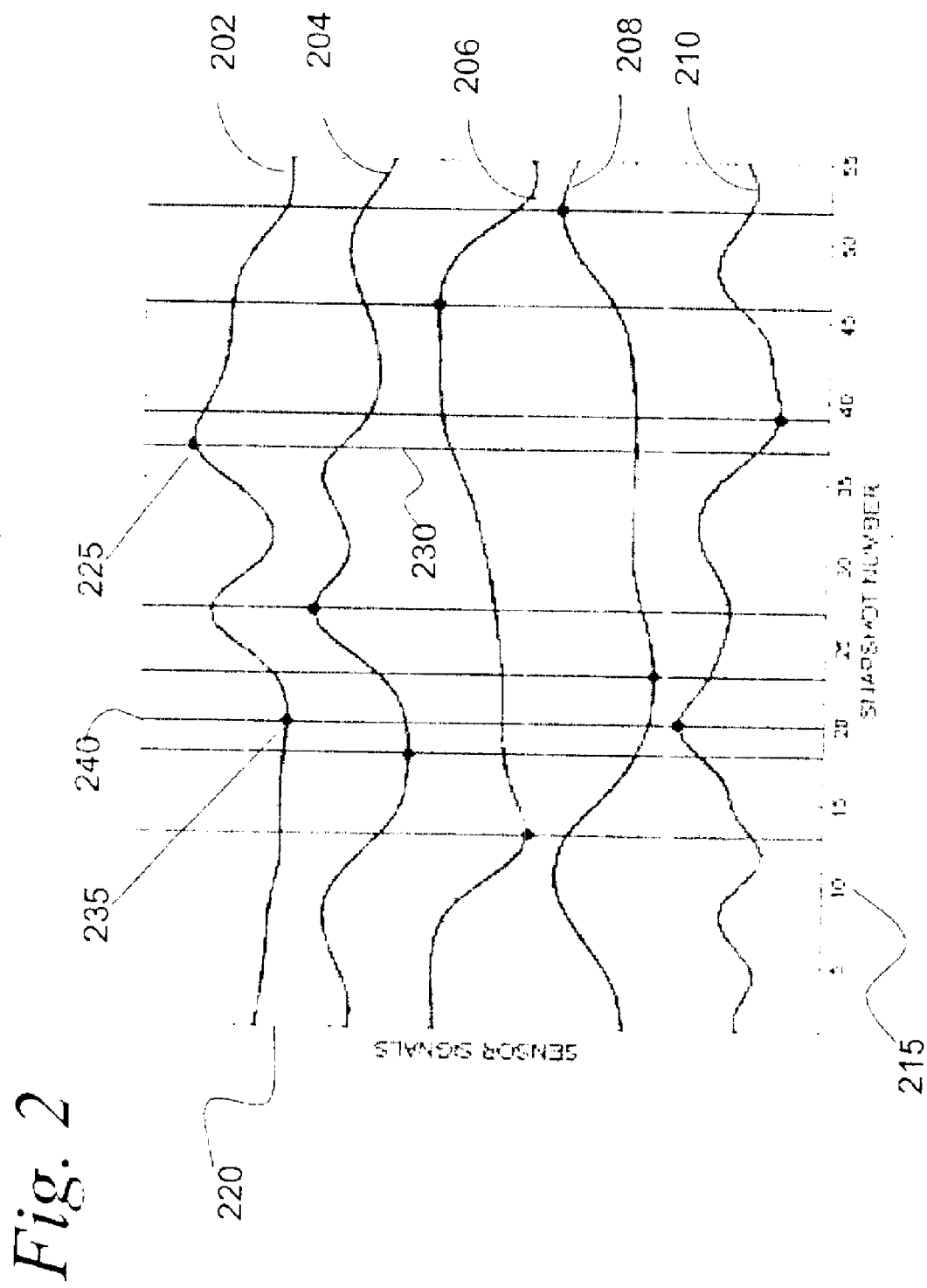
FIG. 2 illustrates a method for creating a representative "training" data set from collected sensor data for use in the invention.

A method for training the empirical model is graphically depicted in FIG. 2, wherein collected historic sensor data for the process or machine is distilled to create a representative training data set, the reference library. Five sensor signals 202, 204, 206, 208 and 210 are shown for a process or machine to be monitored, although it should be understood that this is not a limitation on the number of sensors that can be monitored using the present invention. The abscissa axis 215 is the sample number or time stamp of the collected sensor data, where the data is digitally sampled and the sensor data is temporally correlated. The ordinate axis 220 represents the relative magnitude of each sensor reading over the samples or "snapshots". Each snapshot represents a vector of five elements, one reading for each sensor in that snapshot. Of all the previously collected historic sensor data representing normal or acceptable operation, according to this training method, only those five-element snapshots are included in the representative training set that contain either a minimum or a maximum value for any given sensor. Therefore, for sensor 202, the maximum 225 justifies the inclusion of the five sensor values at the intersections of line 230 with each sensor signal, including maximum 225, in the representative training set, as a vector of five elements. Similarly, for sensor 202, the minimum 235 justifies the inclusion of the five sensor values at the intersections of line 240 with each sensor signal.

Figure 3:
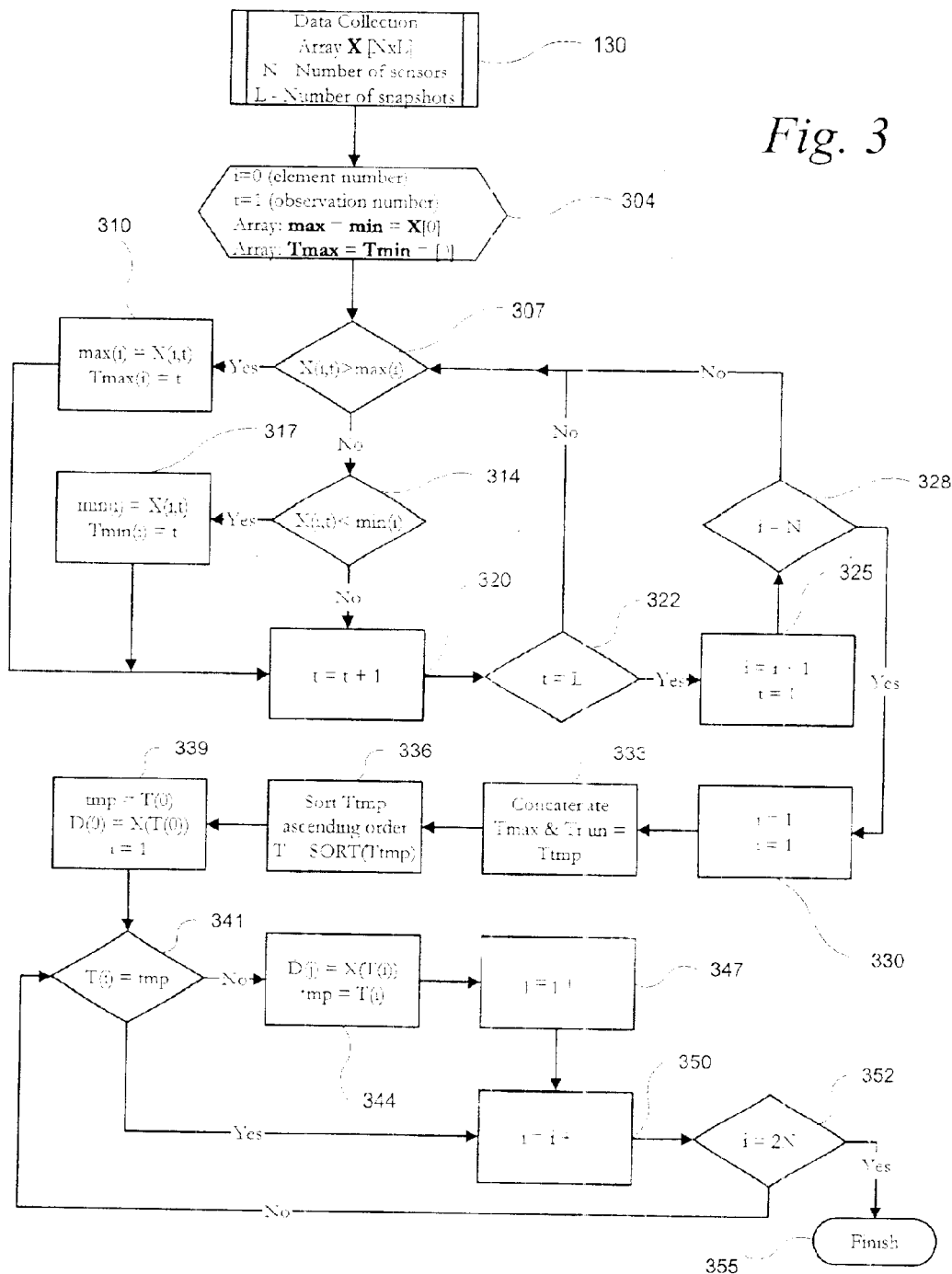
FIG. 3 illustrates a flowchart for creating a representative "training" data set from collected sensor data for use in the invention.

Selection of representative data is further depicted in FIG. 3. Data collected representing normal operation has N sensors and L observations or snapshots or temporally related sets of sensor data that comprise an array X of N rows and L columns. In step 304, a counter i for element number is initialized to zero, and an observation or snapshot counter t is initialized to one. Two arrays max and min for containing maximum and minimum values respectively across the collected data for each sensor are initialized to be vectors each of N elements which are set equal to the first column of X. Two additional arrays Tmax and Tmin for holding the observation number of the maximum and minimum value seen in the collected data for each sensor are initialized to be vectors each of N elements, all zero.

In step 307, if the sensor value of sensor i at snapshot t in X is greater than the maximum yet seen for that sensor in the collected data, max(i) is update to equal the sensor value and Tmax(i) stores the number t of the observation in step 310. If not, a similar test is done for the minimum for that sensor in steps 314 and 317. The observation counter t is incremented in step 320. In step 322, if all the observations have been reviewed for a given sensor (t=L), then t is reset and i is incremented (to find the maximum and minimum for the next sensor) in step 325. If the last sensor has been finished (i=N), step 328, then redundancies are removed and an array D is created from a subset of vectors from X.

First, in step 330, counters i and j are initialized to one. In step 333, the arrays Tmax and Tmin are concatenated to form a single vector Ttmp having 2N elements. These elements are sorted into ascending (or descending) order in step 336 to form array T. In step 339, holder tmp is set to the first value in T (an observation number that contains a sensor minimum or maximum). The first column of D is set equal to the column of X corresponding to the observation number that is the first element of T. In the loop starting with decision step 341, the ith element of T is compared to the value of tmp that contains the previous element of T. If they are equal (the corresponding observation vector is a minimum or maximum for more than one sensor), it has already been included in D and need not be included again. Counter i is incremented in step 350. If they are not equal, D is updated to include the column from X that corresponds to the observation number of T(i) in step 344, and imp is updated with the value at T(i). The counter j is then incremented in step 347. In step 352, if all the elements of T have been checked, then the distillation into training set D has finished, step 355.

A variety of empirical models are considered to be the object of the present adaptive decisioning and retraining invention, including neural networks, fuzzy logic models, and the like. All these empirical models employ data from the process or machine under surveillance to model and thereby monitor the process or machine. All are subject to the shortcomings of the historic data provided when the models are built, in view of the graceful aging, settling or previously unencountered states of the monitored process or machine. By way of an example of applying the methods of the current invention, the empirical modeling technique of the aforementioned patent to Gross et al., will be described. This empirical modeling technique uses a similarity operator, which is also an inventively employed in the present invention in the form of global similarity and other adaptation decisioning techniques described herein. Generally, a similarity operation provides a scalar similarity score scaled between one extreme (typically "1" for "identical") and another extreme (typically "zero" for "completely dissimilar"), upon a comparison of two numbers. More particularly, this can be adapted for comparing two vectors having equal numbers of elements, where a similarity score is yielded for comparing each like element of the two vectors, and then averaging or otherwise statistically combining the similarity scores into one vector-to-vector similarity score.

The calculations for the similarity operation are now described in detail below. In what follows, the subscript "in" generally corresponds to the actual snapshot obtained from the input bus 108, which may comprise for example ten real time correlated sensors, and the subscript "out" generally corresponds to estimates generated by the estimation engine 111. The reference library 114 comprises a series of snapshots selected according to the above-described training method, each snapshot being a vector of sensor data, arranged like the input snapshot is arranged. To follow the example then, the reference library would comprise vectors made up of ten elements each. This reference library will also be referred to as the matrix D.

The step of providing a representative training set according to the description above results in a matrix D of values, having ten rows (corresponding to the ten parameters measured on the process or machine) and a sufficient number n of columns (sets of simultaneous or temporally related sensor readings) to properly represent the full expected dynamic operating range of the process or machine. While the order of the columns does not matter in D, the correspondence of rows to particular sensors must be fixed.

Then, using $y_{in}$ to designate a vector (having ten elements in this example) corresponding to the input snapshot from input bus 108, a vector $y_{out}$ is generated as the estimate from estimation engine 111 having ten elements, according to:

$$\vec{y}_{out} = \bar{D} \cdot \vec{W}$$

where W is a weight vector having as many elements N as there are columns in D, generated by:

$$\vec{W} = \frac{\hat{W}}{\left(\sum_{j=1}^{N} \hat{W}(j)\right)}$$

$$\vec{\hat{W}} = (\overline{D^T} \otimes \bar{D})_{-1} \cdot (\overline{D^T} \otimes \vec{y}_{in})$$

where the similarity operation is represented by the circle with the cross-hatch inside it. The superscript "T" here represents the transpose of the matrix, and the superscript "−1" represents the inverse of the matrix or resulting array. Importantly, there must be row correspondence to same sensors for the rows in D, $y_{in}$ and $y_{out}$. That is, if the first row of the representative training set matrix D corresponds to values for a first sensor on the machine, the first element of $y_{in}$ must also be the current value (if operating in real-time) of that same first sensor.

The similarity operation can be selected from a variety of known operators that produce a measure of the similarity or numerical closeness of rows of the first operand to columns of the second operand. The result of the operation is a matrix wherein the element of the ith row and jth column is determined from the ith row of the first operand and the jth column of the second operand. The resulting element (i,j) is a measure of the sameness of these two vectors. In the present invention, the ith row of the first operand generally has elements corresponding to sensor values for a given temporally related state of the process or machine, and the same is true for the jth column of the second operand. Effectively, the resulting array of similarity measurements represents the similarity of each state vector in one operand to each state vector in the other operand.

By way of example, one similarity operator that can be used compares the two vectors (the ith row and jth column) on an element-by-element basis. Only corresponding elements are compared, e.g., element (i,m) with element (m,j) but not element (i,m) with element (n,j). For each such comparison, the similarity is equal to the absolute value of the smaller of the two values divided by the larger of the two values. Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

Figure 4:
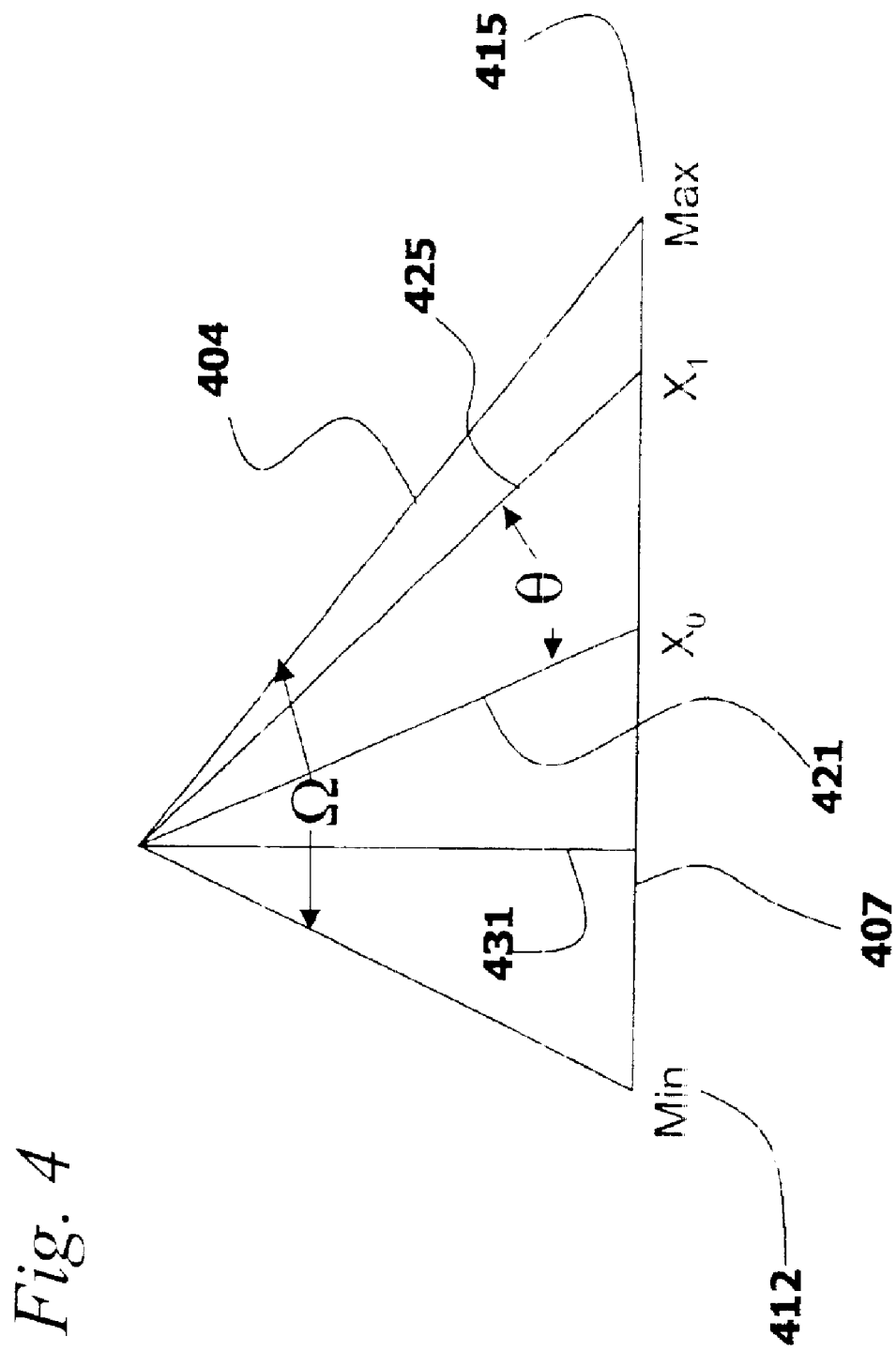
FIG. 4 illustrates the computation of one of the similarity operators employed in the present invention.

Another example of a similarity operator that can be used can be understood with reference to FIG. 4. With respect to this similarity operator, the teachings of U.S. Pat. No. 5,987,399 to Wegerich et al. are relevant, and are incorporated in their entirety by reference. For each sensor or physical parameter, a triangle 404 is formed to determine the similarity between two values for that sensor or parameter. The base 407 of the triangle is set to a length equal to the difference between the minimum value 412 observed for that sensor in the entire training set, and the maximum value 415 observed for that sensor across the entire training set. An angle Ω is formed above that base 407 to create the triangle 404. The similarity between any two elements in a vector-to-vector operation is then found by plotting the locations of the values of the two elements, depicted as $X_0$ and $X_1$ in the figure, along the base 407, using at one end the value of the minimum 412 and at the other end the value of the maximum 415 to scale the base 407. Line segments 421 and 425 drawn to the locations of $X_0$ and $X_1$ on the base 407 form an angle θ. The ratio of angle θ to angle Ω gives a measure of the difference between $X_0$ and $X_1$ over the range of values in the training set for the sensor in question. Subtracting this ratio, or some algorithmically modified version of it, from the value of one yields a number between zero and one that is the measure of the similarity of $X_0$ and $X_1$.

Any angle size less than 180 degrees and any location for the angle above the base 407 can be selected for purposes of creating a similarity domain, but whatever is chosen must be used for all similarity measurements corresponding to that particular sensor and physical parameter of the process or machine. Conversely, differently shaped triangles 404 can be used for different sensors. One method of selecting the overall shape of the triangle is to empirically test what shape results in consistently most accurate estimated signal results.

For computational efficiency, angle Ω can be made a right angle (not depicted in the figure). Designating line segment 431 as a height h of the angle Ω above the base 407, then angle θ for a given element-to-element similarity for element i is given by:

$$\theta_i = \tan^{-1}\left(\frac{h}{X_1(i)}\right) - \tan^{-1}\left(\frac{h}{X_0(i)}\right)$$

Then, the elemental similarity is:

$$s_i = 1 - \frac{\theta_i}{\pi/2}$$

As indicated above, the elemental similarities can be statistically averaged or otherwise statistically treated to generate an overall similarity of a snapshot to another snapshot, as if called for according to the invention.

Yet another class of similarity operator that can be used in the present invention involves describing the proximity of one state vector to another state vector in n-space, where n is the dimensionality of the state vector of the current snapshot of the monitored process or machine. If the proximity is comparatively close, the similarity of the two state vectors is high, whereas if the proximity is distant or large, the similarity diminishes, ultimately vanishingly. By way of example, Euclidean distance between two state vectors can be used to determine similarity. In a process instrumented with 20 sensors for example, the Euclidean distance in 20-dimensional space between the currently monitored snapshot, comprising a 20 element state vector, and each state vector in the training set provides a measure of similarity, as shown:

$$S = \frac{1}{\left[1 + \frac{\|\vec{x} - \vec{d}\|^\lambda}{c}\right]}$$

wherein X is the current snapshot, and d is a state vector from the training set, and $\lambda$ and c are user-selectable constants.

Turning now to the adaptive systems and methods of the present invention, adaptation decision module 125 generally performs tests on the current snapshot of sensor data or a sequence of these, to determine whether or not to adapt to a new operational state of the process or machine. This determination has inherent in it several more particular decisions. First, the adaptation decision module must decide whether or not the entire monitoring apparatus has just initiated monitoring or not. If monitoring has just started, the adaptation decision module will wait for several snapshots or samples of data for the monitoring to stabilize before making tests to decide to adapt. A second decision related to the overall decision to adapt pertains to whether or not the monitored process or machine has entered a transition or not. Typically, when a process or machine changes states, whether through process upset, machine failure, or merely a change in normal operation, there is a period of time during which the monitored sensors provide dynamic data, and the process or machine is neither stably in its old mode nor yet stably in its new target mode. This transition is usually manifested as a transient swing in one or more of the sensor data. The adaptation decision module waits for the transition to complete before adapting. Therefore, in addition to the second decision of determining when a transition has begun, a third decision that must be made is whether the transition period is over, and the monitored process or machine is in a new stable operational state. It should be understood that "stable" does not mean a state in which all sensor readings are flat, but rather a state that can be reliably recognized by the empirical model, which may entail dynamic but nonetheless correlated movement of sensor readings. A fourth decision that must be made after a transition is to determine if the new stable operational state is one that has not been seen by the empirical model or not. If it has not before been encountered, it is a candidate for adaptation. Finally, a fifth decision that must be made is whether a new, previously unencountered state is in fact a new acceptable state, or a process or sensor upset.

Figure 5:
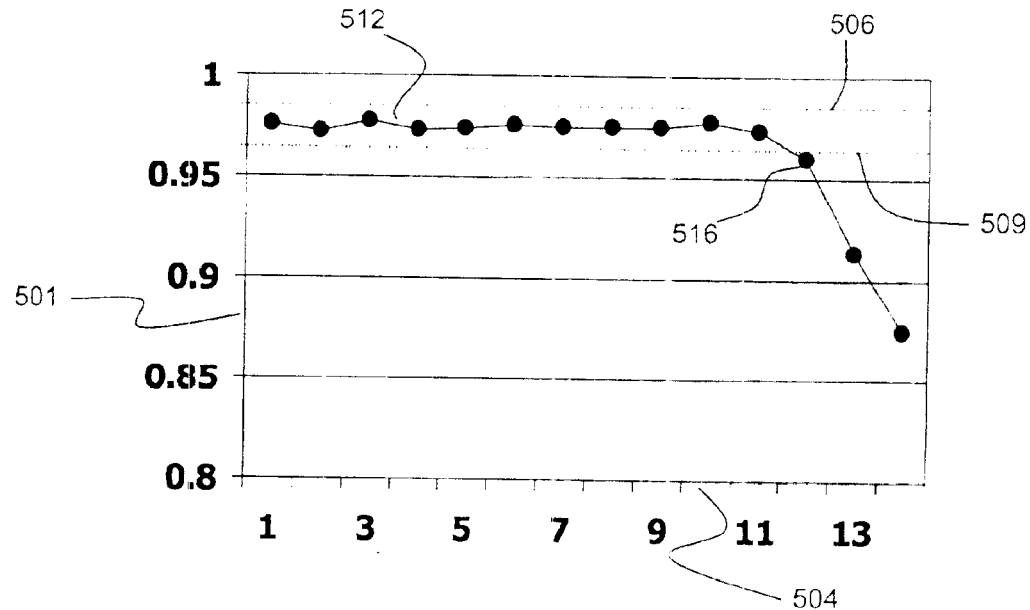
FIG. 5 illustrates a chart of global similarity values showing a move into transition out of one state of operation by the monitored process or machine.

According to the invention, detection of a transient as evidence of a possible transition out of the current operational state can be performed using the global similarity operator. The global similarity is the vector-to-vector similarity score computed from a comparison of the current snapshot from the input bus 108 against the estimate from the estimation engine 111. Typically, the estimate is the estimate generated in response to the current snapshot, but it is also within the scope of the present invention that it can be an estimate generated from a prior snapshot, such as when the model generates predictive estimates for sensor values. The calculations for generating a vector-to-vector similarity value have already been outlined above. Turning to FIG. 5, a chart is shown of a typical global similarity generated for a process or machine under monitoring. The vertical axis 501 is the global similarity score, and the horizontal axis 504 is the snapshot or sample number of the input snapshots, which are typically sequential in time, but may also represent some other ordered presentation of snapshots. An upper limit 506 and a lower limit 509 are calculated as described below for use in determining at what point the global similarity line or signal 512 indicates a transient. The global similarity score at 516 is shown dropping below the limit 509, as are subsequent global similarity scores.

Generally, when a process or machine is operating in a state that is recognized by the empirical model the global similarity between the estimate and the current input are high, close to 1, and do not vary much. The location of the limits 506 and 509 can be user-selected, or can be automatically selected. One method for automatically selecting these limits is to collect a series of successive global similarities and determine the mean of them and the standard deviation. The limits are then set at the mean plus or minus a multiple of the standard deviation. A preferred multiple is 3 times the standard deviation. The number of successive global similarities used can be any statistically significant number over which the process or machine is in a modeled operational state, and 100–1000 is a reasonable number. A smaller number may be reasonable if the sampling rate for monitoring is lower, and in some cases can be in the range of 5–10 where the sampling rate for monitoring is on the order of single digits for the time period in which the monitored system or process can substantially deviate from normal operation.

Yet another way of computing the limits 506 and 509 is as follows. After accumulating a historic data set from which a reference library is selected according to a training method like the Min-Max method described with reference to FIGS. 2 and 3, the remaining snapshots of the historic set that were not selected into the reference library can be fed in as input to the empirical model, and the global similarities for the estimates generated therefrom can be used. These provide a mean and a standard deviation for setting the limits 506 and 509 as described above.

According to yet another way of defining limits 506 and 509, they are not straight line limits, but instead limits that float a fixed amount on either side of a mean determined over a moving window of global similarities. For example, the standard deviation may be computed according to either way described above, and then a multiple of the standard deviation selected. This is then set around a mean this is defined as the mean global similarity of the last several snapshots, for example the last five or the last ten.

When a global similarity at a snapshot 516 travels outside the limits 506 or 509, the adaptation decision module recognizes this as a transient. This signifies a likelihood that a transition of the monitored process or machine is starting. The adaptation decision module can turn off monitoring, or at least alert generation from statistical testing module 122 upon detection of a transient. Further, the adaptation decision module then begins to employ one or more of several tests that can be used to determine when a transition period ends.

Figure 6:
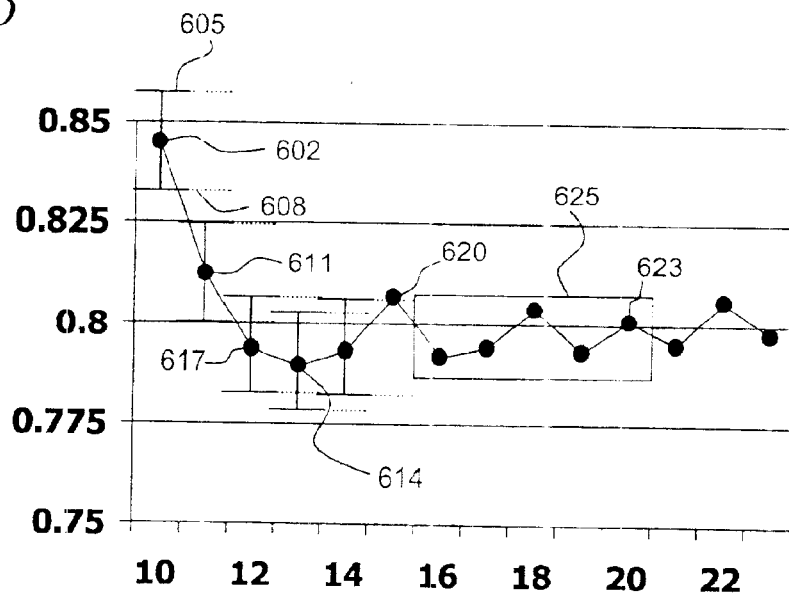
FIG. 6 illustrates a chart of global similarity values showing completion of a transition phase into another potentially unmodeled state of operation by the monitored process or machine.

Preferably, upon first detecting the transient, the adaptation decision module places upper limit 506 and lower limit 509 around each subsequent global similarity point, using the point as the mean, but still using the selected multiple of the prior established standard deviation as the limits. Each successive point is compared to these limits as set around the "mean" of the last point location. This can be seen in FIG. 6, which shows a process or machine coming out of transition, as measured by global similarity. Point 602 is a transition point. Upper limit 605 and lower limit 608 are shown at some multiple of the prior established standard deviation around the point 602. Point 611 falls outside of this range, and therefore is also a transition point. However, point 614 falls within the range around point 617, and the adaptation decision module then begins to keep track of these two and subsequent points to test for stability of the global similarity. One way of doing this is to count a successive number of snapshot global similarities that all fall within the range around the prior global similarity, and when a particular count is reached, determine the process or machine to have stabilized. A typical count that can be used is five snapshots, though it will be contingent on the dynamics of the process or machine being monitored, and the sample rate at which snapshots are captured. Counting can start at either point 617 or 614. If a subsequent point falls outside of the range, before the chosen count is reached, such as is shown at point 620, the point is determined to be in transition, and the count is zeroed. Starting at point 620 then, the count would begin again if the point following were within range. Until the count is reached, the process or machine is considered to still be in transition. Another way of determining if a the monitored process or machine has stabilized in a new state is to look for at least a selected number of global similarity scores over a moving window of snapshots that lie within the aforementioned range, where the range is set around the mean of all previous global similarities in the window for any given global similarity. By way of example, if the window of snapshots is five, and the selected number in the set of five that must have qualifying global similarities in range is four, then the second global similarity score qualifies if it lies in the range set around the first global similarity, and the third global similarity qualifies if it lies in the range set around the mean of the first and second global similarities, and so on. If the four global similarities after the first all qualify, then the system has stabilized in a new state. The window can be chosen to be much longer, 50 for example, depending on the sampling rate of monitoring, and the selected least number of qualifying values can be 40 for example.

Figure 7:
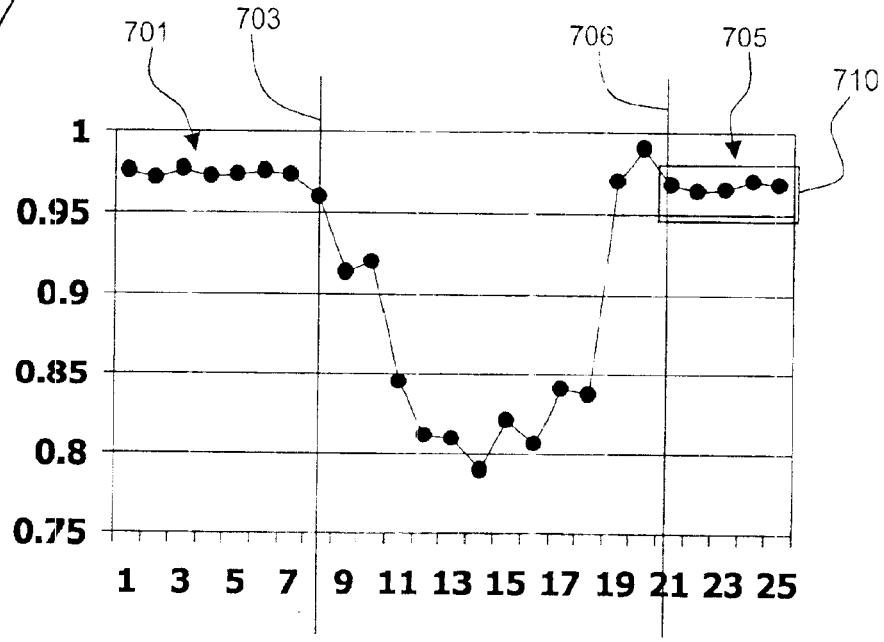
FIG. 7 illustrates a chart of global similarity values showing a transition from one modeled state to another modeled state of the monitored process or machine.

When a count is reached of in-range global similarity points, as for example at point 623 after five consecutive in-range points indicated by box 625, the adaptation decision module indicates the transition is over and a new state has been reached. Note in FIG. 6, the global similarity has stabilized at a lower overall similarity (around 0.8) than was shown in FIG. 5 (around 0.975), indicating the empirical model is not modeling this state as well as the previous state, and may in fact not be recognizing the new state at all. Typically, if the new state is also part of the empirical model, the global similarity curve will look more like that shown in FIG. 7. Therein, a first operational state is indicated by global similarities 701. A transition is begun at transient 703, and continues until a new stable operational state 705 is reached beyond point 706 as indicated by five (or some other preselected number) of consecutive global similarities 710 within range of each other.

According to yet another way for determining adaptation, independent of the use of the global similarity, the adaptation decision module can examine certain of the sensor data that comprise the current snapshot that are designated by the user usually upon installation as control variables in the monitored process or machine. This technique provides a much simpler way of determining when to adapt, but can only be employed when control variables are clearly separable from dependent parameters of the process or machine. A control variable is typically manually determined ahead of model building with domain knowledge of the application. Control variables are typically those inputs to a process or machine that drive the operational behavior of the process or machine. They are often environmental variables over which no control can be exerted. For example, in an engine or turbine, ambient temperature is often a control variable. When training the empirical model, as for example outlined above with the Min-Max method, the software for executing the inventive adaptive monitoring system keeps track of the overall ranges of the control variables seen in the training set from which the reference set is distilled. Then, in monitoring operation, the adaptive decision module simply compares the current control variable(s) to those ranges, and if one or more control variables are now outside the range trained on, the adaptation decision module can initiate retraining. It is also useful to use control variables alongside the global similarity operator, so that a determination can be made when the transition from one state to another is over, as described above. Alternatively, standard techniques known in the art for analyzing the stability of variables can also be employed directly against the control variables, if the dynamics of the control variables permits, to make the determination of when a transition begins and ends. In any case, in using control variables to determine when to retrain the empirical model, what is sacrificed is the ability to monitor those control variables for upset. In other words, if a control variable goes outside the range that was trained on, it is assumed by the inventive apparatus that a new acceptable operational state has been encountered, rather than assuming that the control variable indicates abnormal operation.

In the event that this control variable-based decision is not employed, there remains after determining that a transition has stopped, the step of determining whether the new state is also already sufficiently modeled, or is a heretofore-unencountered state that must be adapted to. For this the adaptation decision module has a battery of tests that can be used to make the determination in addition to the control variable range check.

Figure 8:
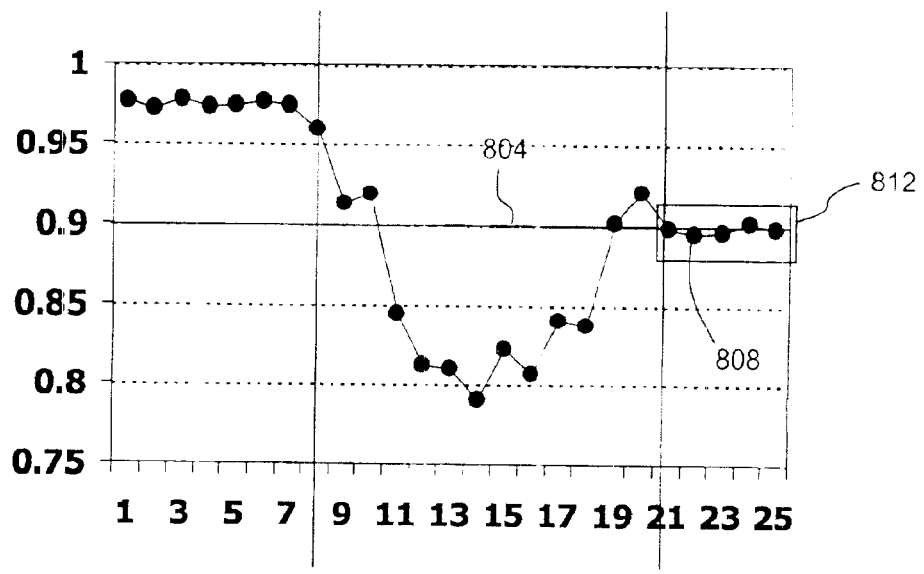
FIG. 8 illustrates a chart of global similarity values showing a transition from one modeled state to another potentially unmodeled state of the monitored process or machine.

In a first technique, a threshold may be applied to the mean global similarity of the new state at the end of the transition period. For example, with reference to FIG. 8, a mean lower than a 0.90 threshold 804 can be used to indicate that the new state is not sufficiently modeled by the empirical model, and the model must be adapted to accommodate the new state. According to the invention, the mean can be examined over one snapshot 808 to make this decision (in which case the mean is simply the global similarity), or alternatively can be examined over a series of snapshots, where the mean is constantly recalculated using the most recent 5 results, by way of example. If the mean then falls below the selected threshold more than a selected fraction of snapshots over a series of snapshots (for example half), then the new state is considered to be unrecognized and potentially subject to adaptation. For example, as shown in FIG. 8 the five points 812 have four that fall below the threshold 804, and only one above, and therefore this state would be considered unrecognized.

According to a second technique, a window of successive global similarity values can be compared to the selected threshold, and if at least a certain number of these falls below the threshold, then the new state is considered to be unrecognized and potentially subject to adaptation. For example, if a moving window of five global similarities are examined, and at least three are below the threshold, the new state can be deemed subject to adaptation.

Figure 9A:
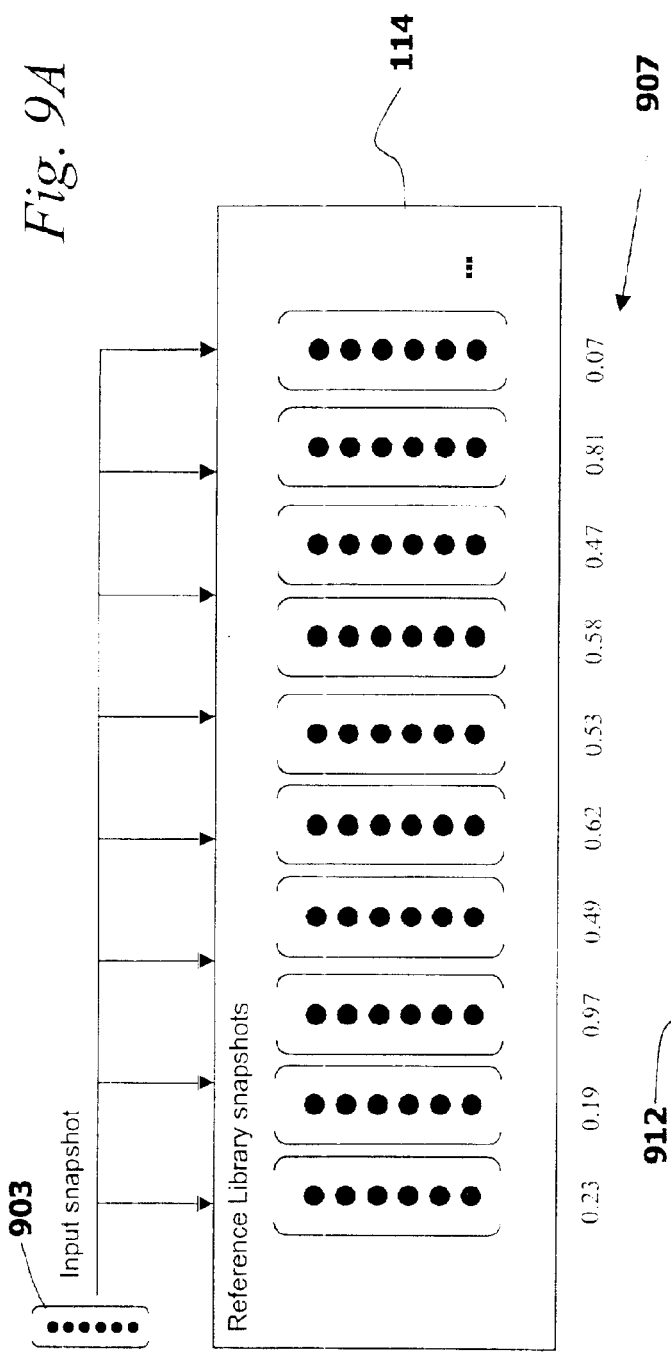
FIG. 9A symbolically illustrates a similarity operation between a current snapshot and the reference library snapshots.
Figure 9B:
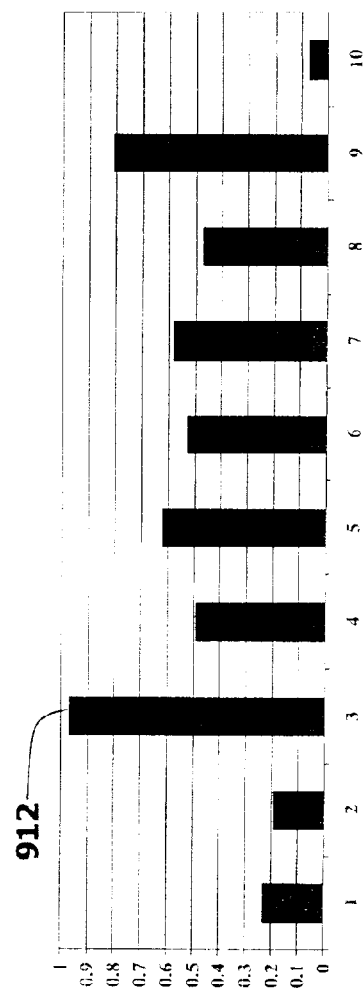
FIG. 9B illustrates a chart of similarity scores for comparisons in FIG. 9A, with a highest similarity indicated.

In a third technique depicted in FIGS. 9A and 9B, the actual current snapshot can be processed for similarity against the entire reference library (as is done as part of the process of generating the estimate), and a test is performed on the similarities. Given that the adaptation decision module indicates a new state has been settled into, the similarity scores of the current snapshot against the reference library can be examined for the highest such similarity, and if this is below a chosen threshold, the new state can be deemed an unrecognized state that is a candidate for adaptation. A typical threshold for this would be in the range of less than 0.90. As can be seen in FIG. 9A, upon comparing the current snapshot 903 (symbolized by a vector symbol with dots standing in for sensor values) to the snapshots of the reference library 114, a series of similarity scores 907 are generated for each comparison as part of routine monitoring. The scores are shown in a chart in FIG. 9B, where a highest similarity score 912 is above the 0.90 threshold, and therefore the current snapshot does not indicate a need to adapt. Again, this decision can be made in one snapshot, or can be made by determining whether a selected fraction of more of a series of current snapshots have highest reference library similarities that fall below the chosen threshold.

Yet a third technique that may be employed to determine if a new state presents itself and the empirical model must be adapted is to examine the alarm fraction generated by a SPRT module on the monitoring apparatus.

According to the invention, the global similarity operator has the inherent ability to distinguish between a process or sensor upset and a change of state. When a sensor fails, the empirical model typically estimates a reasonable value for what the sensor ought to indicate, based on the other input sensors. The difference between this failed sensor reading and the estimate for it (really an estimate of the underlying measured parameter) provides a means for statistical testing module 122 to alert a human operator that there is a problem at the failed sensor. However, due to the nature of the similarity operation, the effect on the global similarity is limited. In fact, the mean of several sequential global similarities in the case of a failed sensor may not change much from the mean when the sensor was not failed, though the variance of the global similarity may increase somewhat (yet usually still remain within the thresholds 506 and 509 indicated in FIG. 5). In this way, the adaptation decision module will generally not attempt to adapt on a failed sensor, and the monitoring system can successfully alert on the failed sensor.

When a process upset occurs that affects one or only a few of the monitored parameters, the adaptation decision module will similarly not indicate the need to adapt, even though alerts for the upset are occurring in the monitoring apparatus. This is true even where a process upset eventually leads to significant change in all the variables, because the monitoring apparatus of the present invention is designed to catch the earliest possible sign of change and alert on it. Long before the process upset affects all variables, it is likely the human operator would have been notified of the upset.

In addition, a catastrophic process upset usually also fails to exhibit a settling into a new state. Global similarities for a severely upset process not only potentially drop to very low levels (less than 0.50) but also suffer from a continuing large variance. Typically, a process upset will fail to settle into a new stable state with the rapidity that a mere operational mode shift will, and this can be used to distinguish a process upset from a new acceptable operational state. This is best determined empirically based on the application, and a user selectable setting can be provided in the software of the adaptation decision module to designate a period during which a transition must settle into a stable state or otherwise be considered a process upset and turn on alerting again. According to the invention, the adaptation decision module can also measure the variance of the global similarity, and if the variance is still above a certain threshold after a selected timeout period, the transition can be deemed a process upset, and again alerting can be turned back on in the monitoring coming through statistical testing module 122.

After the adaptation decision module has ascertained that:
1) a control variable is now out of range, and adaptation is warranted because:
   a) the global similarity is now below an acceptable threshold, indicating a new unrecognized state; or
   b) the highest similarity of the current snapshot or sequence of snapshots is below an acceptable threshold, indicating a new unrecognized state; or
   c) a number of alerts are being generated, starting coincidentally with the change in the control variable; or
2) an adaptation is warranted because:
   a) a transient was detected on global similarity, signaling a transition; and
   b) the transition completed and a new stable state was realized; and
     i) the new stable state is not recognized because the global similarity is now below an acceptable threshold; or
     ii) the new stable state is not recognized because the highest similarity of the current snapshot or sequence of snapshots is below an acceptable threshold; or
     iii) the new stable state is not recognized because of the fraction of alerts that are being generated in monitoring is above a threshold.

An adaptation step is then carried out by the retrain module 128. According to the invention, retraining can be accomplished either by adding snapshots from the sequence of current snapshots to the reference library, or by replacing snapshots in the reference library. Both modes can be used, where the reference library has an initial size at implementation of the monitoring system, and a maximum size is selected to which the reference library can grow, and beyond which newly added snapshots must replace existing snapshots.

When adding current snapshots to the reference library, the retrain module first decides which snapshots to select for addition. According to one embodiment, when the adaptation decision module identifies based on the global similarity a sequence of several, e.g., 5 snapshots, for which the global similarity has stabilized, that is a new state, and the new state has been determined to be previously unmodeled, the five snapshots can be used to augment the reference library. In addition, as of the sixth snapshot, the retrain module begins to go into a longer adaptation cycle, checking the snapshots as they come in and testing using the global similarity test whether the newly augmented model is adequately modeling the new snapshots. A threshold can again be determined, for example 0.90, which the newly augmented reference library must surpass in global similarity, for the adaptation to be declared finished. If the threshold is not met, then the retrain module continues to add new snapshots (or at least those snapshots which do not appear to be adequately modeled) as long as the new state is stable and not a new transient (indicating a new stage of transition or perhaps process upset or sensor failure. A set limit to how long a retrain module will continue to engage in the longer adaptation cycle beyond the end of a transition can also optionally be set, so that adaptation does not continue indefinitely. This may apply to a new state which simply cannot be adequately modeled to the global similarity threshold chosen as the cutoff for adaptation.

According to yet another mode, instead of merely adding the additional identified snapshots to the reference library, the entire reference library and the additional snapshots can be combined into a total training set to which a training method such as Min-Max is applied, to distill the new training set into a new reference library.

When the size limit on the reference library is reached, the vector removal module can use several methods to replace or remove old snapshots (or vectors of sensor data) from the reference library. According to a first way, for each snapshot that will be added beyond the limit, the vector in the reference library which bears the highest similarity to the snapshot desirably added is removed. For this operation the similarity operator is used as described herein. According to a second method, upon using a training method such as Min-Max, the time stamp of when a vector is added to the reference library is examined through the entire library, and the oldest time stamped vector is removed. In this case, the replacement snapshot bears the time stamp of the moment of replacement, and therefore has the newest time stamp. According to yet another method, during regular monitoring mode of the empirical model-based monitoring apparatus, for each current snapshot from the monitored process or machine, a determination is made which snapshot in the reference library has the highest similarity to it, and that snapshot is time-stamped with the moment of comparison. Therefore, each snapshot in the reference library is potentially being updated as being the last closest state vector seen in operation of the process or machine. Then, when adding a new vector as part of adaptation, the vector with the oldest time stamp is replaced. The new replacement snapshot of course bears a current time stamp. In this way, snapshots in the reference library representing states the monitoring system has not seen in the longest time, are replaced first with new updated snapshots. This mode is particularly useful when monitoring equipment or processes that settle gracefully with age, and are not expected to achieve exactly the operational states they were in when they were brand new.

It will be appreciated by those skilled in the art that modifications to the foregoing preferred embodiments may be made in various aspects. The present invention is set forth with particularity in any appended claims. It is deemed that the spirit and scope of that invention encompasses such modifications and alterations to the preferred embodiment as would be apparent to one of ordinary skill in the art and familiar with the teachings of the present application.

What is claimed is:

1. An apparatus for detecting an operational state transition in a system instrumented with sensors, comprising:
    a model for generating estimates of sensor values in response to receiving actual sensor values characterizing the operation of the system;
    a global similarity engine for generating a global similarity score for a comparison of a set of estimated sensor values from said model and a related set of actual sensor values from said system by employing a similarity operation applied to said set of estimated sensor values and said set of actual sensor values; and
    a state transition detector disposed to receive global similarity scores from said global similarity engine and indicate an operational state change when a global similarity score falls outside of a selected range.

2. An apparatus according to claim 1 wherein the model is an empirical model.

3. An apparatus according to claim 2 wherein the empirical model employs a similarity operator.

4. An apparatus according to claim 3 wherein the empirical model comprises a reference library of snapshots of known operational states of the system and generates the estimates from a composite of contributions from the reference library snapshots according to their similarity to the received actual sensor values.

5. An apparatus according to claim 4 wherein the similarity operator employed by the empirical model compares corresponding elements of a snapshot of received actual sensor values and a reference library snapshot to generate elemental similarities, and statistically combines the elemental similarities to generate a snapshot similarity of the received actual snapshot and the reference library snapshot.

6. An apparatus according to claim 1 wherein the global similarity engine compares corresponding elements of a snapshot of received actual sensor values and a related snapshot of estimates to generate elemental similarities, and statistically combines the elemental similarities to generate a global similarity score.

7. An apparatus according to claim 6 wherein the related snapshot of estimates is generated by the model in response to the snapshot of actual sensor values.

8. An apparatus according to claim 6 wherein the related snapshot of estimates is a prediction related to the snapshot of actual sensor values in time, and generated by the model in response to a previous snapshot of actual sensor values.

9. An apparatus according to claim 1 wherein the selected range has a lower threshold equal to a multiple of a standard deviation for a sequence of global similarity scores, subtracted from the mean of the sequence of global similarity scores.

10. An apparatus according to claim 9 wherein the multiple is in the range of one to three.

11. An apparatus according to claim 1 wherein the selected range has a lower limit selected in the range of 0.85 to 0.95.

12. An apparatus according to claim 1 wherein the state transition detector indicates an operational state change when at least a selected minimum number of global similarity scores in a shifting window of successive global similarity scores fall outside of the selected range.

13. A method for detecting an operational state change in a system having monitored parameters, comprising the steps of:
    receiving actual values of the monitored parameters characterizing the operational state of the system;
    generating estimates of the parameter values in response to receiving actual values;
    determining a global similarity score for a comparison of a set of estimated parameter values and a related set of actual parameter values; and
    indicating an operational state change when a global similarity score falls outside of a selected range.

14. A method according to claim 13 wherein the determining step comprises comparing corresponding elements of a snapshot of received actual parameter values and a related snapshot of estimates to generate elemental similarities, and statistically combining the elemental similarities to generate the global similarity score.

15. A method according to claim 14 wherein the related snapshot of estimates is generated in the generating step in response to the snapshot of actual parameter values.

16. A method according to claim 14 wherein the related snapshot of estimates is a prediction related to the snapshot of actual parameter values in time, and is generated in the generating step in response to a previous snapshot of actual sensor values.

17. A method according to claim 13 wherein the selected range has a lower threshold equal to a multiple of a standard deviation for a sequence of global similarity scores, subtracted from the mean of the sequence of global similarity scores.

18. A method according to claim 17 wherein the multiple is in the range of one to three.

19. A method according to claim 13 wherein the selected range has a lower limit selected in the range of 0.85 to 0.95.

20. A method according to claim 13 wherein the indication step comprises indicating an operational state change when at least a selected minimum number of global similarity scores in a shifting window of successive global similarity scores fall outside of the selected range.

21. A method for determining when a system monitored using a model stabilizes into an operational state, comprising the steps of:

receiving successive snapshots of actual values of monitored parameters characterizing operation of the system;

generating snapshots of estimates of the parameter values in response to receiving snapshots of actual values;

comparing each snapshot of actual values to a related snapshot of estimates to generate a global similarity score for each comparison; and indicating stabilization of the operational state of the system based on the global similarity scores.

22. A method according to claim 21 wherein the indicating step comprises examining a moving window of successive global similarity scores and when each of at least a selected number of successive global similarity scores in the window lies within a selected range around the previous global similarity score, identifying that operational state of the system has stabilized.

23. A method according to claim 21, wherein the indicating step comprises examining a moving window of successive global similarity scores and when each of at least a selected number of successive global similarity scores in the window lies within a selected range around the mean of the previous global similarity scores in the window, identifying that operational state of the system has stabilized.

24. A global similarity engine program product for use in modeling a system having monitored parameters comprising:

computer readable program code means for receiving a snapshot of actual values of the monitored parameters;

computer readable program code means for receiving a snapshot of estimated values of the monitored parameters;

computer readable program code means for generating a global similarity score for a comparison of the snapshot of actual values and the snapshot of estimated values; and computer readable program code means for flagging an operational state change of said system, responsive to a change in said global similarity scores that exceed a certain threshold.

25. A program product according to claim 24 wherein said means for generating compares corresponding elements of the snapshot of received actual values and the snapshot of estimated values to generate elemental similarities, and statistically combines the elemental similarities to generate the global similarity score.

26. A program product according to claim 25 wherein the elemental similarities are generated using a BART similarity operator.

27. A program product according to claim 25 wherein the elemental similarities are generated according to the absolute value of the difference of the corresponding elements, divided by an expected range for the corresponding elements.

28. An apparatus for detecting an operational state transition in a system instrumented with sensors, comprising:

a model for generating estimates of sensor values in response to receiving actual sensor values characterizing the operation of the system;

a global similarity engine for comparing a set of estimated sensor values from said model and a related set of actual sensor values from said system to provide a global similarity signal indicative of the ability of the model to model operation of the system; and a state transition detector disposed to receive said global similarity signal from said global similarity engine and indicate an operational state change when the global similarity signal transgresses a preselected positive or negative threshold.

29. An apparatus according to claim 28 wherein the model is an empirical model.

30. An apparatus according to claim 29 wherein the empirical model employs a similarity operator.

31. An apparatus according to claim 30 wherein the empirical model comprises a reference library of snapshots of known operational states of the system and generates the estimates from a composite of contributions from the reference library snapshots according to their similarity to the received actual sensor values.

* * * * *